United States Patent Office

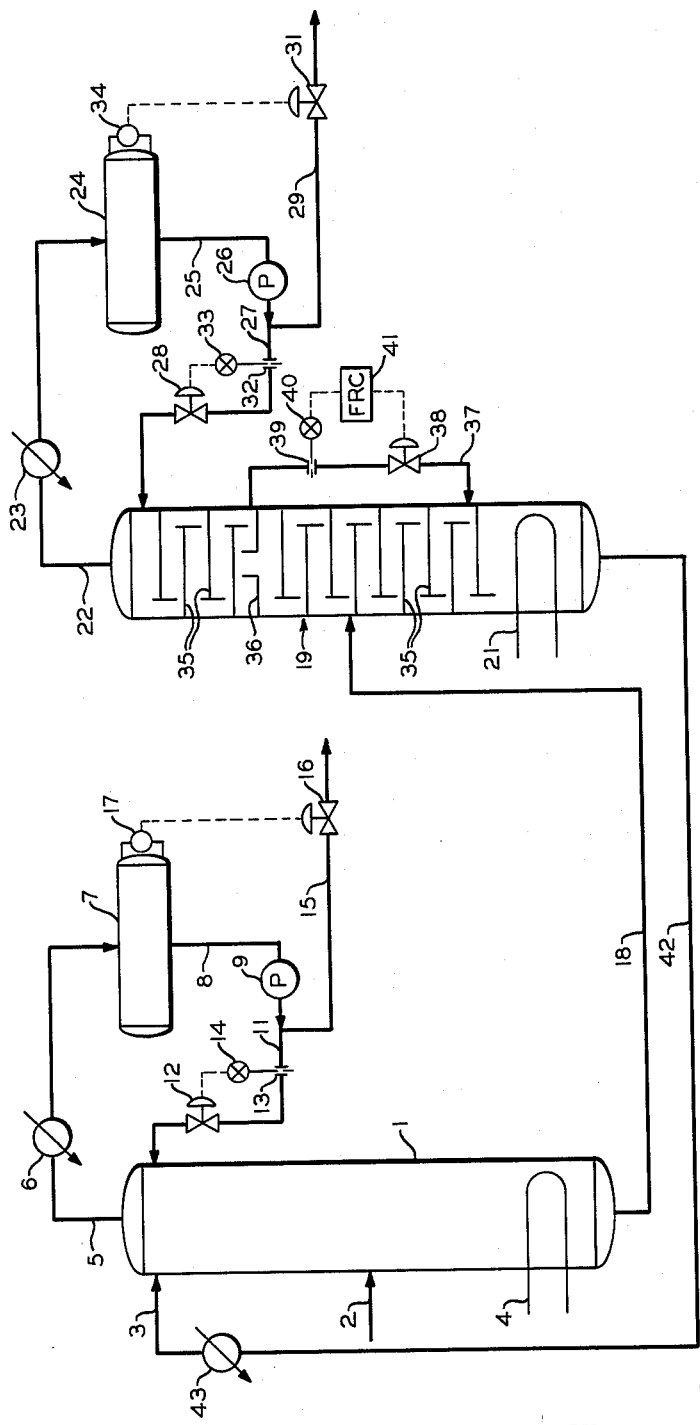
INVENTORS.
R. S. ROGERS
K. R. DEEL

3,240,835
Patented Mar. 15, 1966

3,240,835
METHOD AND APPARATUS FOR SOLVENT EXTRACTION
Ronald S. Rogers and Kenneth R. Deel, Borger, Tex., assignors to Phillips Petroleum Company, a corporation of Delaware
Filed Dec. 4, 1961, Ser. No. 156,569
2 Claims. (Cl. 260—677)

This invention relates to method and apparatus for selective solvent extraction. In one aspect the invention relates to systems utilizing furfural as an absorbent or selective solvent for hydrocarbon materials, especially low-boiling unsaturated aliphatic hydrocarbons. In another aspect the invention relates to an improved stripping column for separating absorbed hydrocarbons from rich furfural. In a still further aspect the invention relates to the operation of a furfural stripping column in an improved manner to reduce the amount of reflux required. In yet another aspect the invention relates to operating a furfural stripping column to reduce the amount of heat required.

Various hydrocarbon conversion processes, such as the high temperature, low pressure cracking of low-boiling paraffin hydrocarbons, heavy oils, etc., produce complex mixtures of hydrocarbons of various types such as paraffins, olefins, diolefins, etc. Such mixtures represent in many instances sources of valuable raw materials for a variety of uses when significant amounts of the materials can be separated economically in a suitably pure form. This is particularly true of aliphatic conjugated diolefins, such as butadiene, which have important uses in the preparation of high molecular weight polymers.

Efficient fractionation of such complex hydrocarbon mixtures ordinarily results in separation into portions consisting essentially of hydrocarbons of the same number of carbon atoms and exhibiting boiling ranges of say 10 to 30° F. Further precise fractionation of the primary cuts may effect appreciable segregation, but this method is expensive and often impractical because of the closeness of boiling points and sometimes the formation of constant boiling hydrocarbon mixtures or azeotropes.

Accordingly, methods other than simple fractionation must frequently be resorted to in order to accomplish the desired separation into substantially pure individual hydrocarbons. One of the well known methods is solvent extraction, whereby the more unsaturated hydrocarbons in either vapor or liquid phase are selectively extracted or absorbed from admixture with the more saturated hydrocarbons by a liquid solvent.

One of the preferred solvents is a furfural-water mixture. The presence of water, generally in the range of about 1 to about 8 weight percent, in the furfural lowers the boiling point, thus resulting in material reduction of the heat required to operate the system. In the selective absorption of volatile hydrocarbons by furfural, the hydrocarbon vapors are introduced into a fractionating column and are selectively extracted in a countercurrent fashion by a furfural-water mixture passing down the column. Heat is applied to the bottom of the fractionating column to provide the vapor necessary for the selective fractionation of the hydrocarbons in the presence of the solvent. The hydrocarbons are thus distilled countercurrent to the furfural-water mixture. The furfural-water mixture rich in the absorbed hydrocarbons is removed from the fractionating column and intoduced into a stripping column.

In the stripping column the dissolved hydrocarbons are stripped out of the furfural-water mixture and removed from the top of the stripping column, while the lean furfural-water mixture is removed from the bottom of the stripping column and returned to the fractionating column for further use.

Difficulties are encountered in the operation of the stripping column when a phase separation occurs in the upper parts of the stripping column. Such phase separation is undesirable in that layers of water immiscible with hydrocarbon will build up on the trays of the column, and these layers periodically cause surging by their overflow. The presence of excess immiscible water also cuts down the capacity of the system. A certain amount of the water can distill overhead along with the hydrocarbons, thus decreasing the purity of the overhead product and decreasing the water content of the furfural. One means of reducing these difficulties is to reflux a large quantity of the overhead from the stripping column.

In accordance with the invention there is provided a method and apparatus whereby these difficulties can be prevented or substantially reduced while decreasing the amount of reflux. This can be accomplished by the incorporation of a donut or dephlegmation tray into the stripping column at a point above the feed input, the removal from the column of immiscible water collecting on the donut tray, and the return to the column at a lower portion thereof of the thus removed water.

Accordingly, it is an object of the invention to provide means and method for effective and efficient solvent extraction of hydrocarbon mixtures. Another object of the invention is to improve the operation of a process using a furfural-water mixture as a selective solvent or absorbent for unsaturated hydrocarbons, such as butenes and/or butadiene. Another object of the invention is to lower the reflux requirement for a furfural stripper. A still further object of the invention is to lower the heat requirement of a furfural stripper.

Other aspects, objects and advantages of the invention will be apparent from a study of the disclosure, the drawing and the appended claims.

The drawing is a diagrammatic representation of one embodiment of the invention. Vaporized hydrocarbon-feed is introduced into extraction column 1 through conduit 2. A furfural-water mixture solvent is introduced into column 1 near the top thereof through conduit 3. The solvent flows downwardly countercurrent to the uprising vaporized feed. Heat is supplied to column 1 through coil 4 to remove the less selectively dissolved hydrocarbons. These hydrocarbons pass upwardly through the column and are removed through line 5. The overhead product in line 5 is passed through condenser 6, wherein at least a portion of the overhead product is condensed, and into accumulator 7. The overhead product is removed from accumulator 7 through line 8 and pump 9, and a portion of the thus removed overhead product is passed through line 11 and valve 12 to an upper part of column 1 as reflux therefor. The amount of reflux can be controlled at a constant rate of flow through the utilization of orifice 13 in line 11 and pressure transmitter 14 to manipulate valve 12. The remainder of the overhead product removed from accumulator 7 is passed through line 15 and valve 16 for further processing. Valve 16 can be controlled by liquid level controller 17 to maintain a predetermined liquid level in accumulator 7.

The furfural-water mixture enriched with the selectively absorbed hydrocarbons is removed from column 1 and passed through line 18 to stripping column 19 near a middle portion thereof. Heat is applied to column 19 through coil 21 to desorb the hydrocarbons in the rich furfural-water mixture. The desorbed hydrocarbons are withdrawn from the overhead of column 19 and passed through line 22 and condenser 23 to accumulator 24. The condensed desorbed hydrocarbon overhead product is removed from accumulator 24 through line 25 and pump 26, and a portion of the thus removed overhead product is passed through line 27 and valve 28 to an upper portion of column 19 as a reflux therefor. The remainder of the condensed overhead product in line 25 is passed through line 29 and valve 31 for further processing.

The amount of reflux to column 19 can be controlled at a constant rate of flow through the utilization of orifice 32 in line 27 and pressure transmitter 33 to manipulate valve 28. Valve 31 can be controlled by liquid level controller 34 to maintain a predetermined liquid level in accumulator 24.

Stripping column 19 contains a plurality of liquid-vapor contact trays 35. It has been found that in the operation of a conventional stripping column a high concentration of immiscible water accumulates in the trays above the feed entrance, requiring a large amount of reflux to keep this water from passing overhead. In accordance with the invention a dephlegmator tray 36 is installed in column 19 above the point of feed entry. The liquid in the dephlegmator tray exists in two phases, a hydrocarbon phase and a water phase. The water phase, which is the lower of the two phases, is removed from the bottom of tray 36 and passed through line 37 and valve 38. The thus removed water is then reintroduced into column 19 near a lower portion thereof. The rate of flow in line 37 can be maintained substantially constant through the utilization of orifice 39, pressure transmitter 40 and flow rate controller 41 to manipulate valve 38. Preferably, the water in line 37 is reintroduced into column 19 in the liquid space of one of the lower trays. The hydrocarbon phase on tray 36 spills over through the middle of tray 36 and down to the tray below. The utilization of dephlegmator tray 36 substantially reduces the amount of water in the upper part of column 19, resulting in a substantial reduction in the amount of reflux required for good stripping operation, and thus reducing the amount of heat required for coil 21. The lean furfural-water mixture is removed from a lower portion of column 19 and passed through line 42 and heat exchanger 43 to line 3 for reintroduction into column 1.

The following example is presented as a further illustration of the invention and should not be construed in limitation thereof.

EXAMPLE

A stripping column was placed into operation to effect the separation of absorbed hydrocarbons from a furfural-water mixture enriched with said absorbed hydrocarbons. The reflux to the stripping column was placed on rate of flow control, and the reflux rate was adjusted to maintain an overhead temperature of 132° F. The steam to the kettle was then placed on manual control and the flow rate of steam was adjusted to maintain a top temperature of 132° F. The column was allowed to reach stable operation, and the kettle temperature and flow rates were recorded. A sample of kettle product was obtained for $C_4$ analysis.

The dephlegmator tray was then placed in service with the lower block valve pinched to maintain a water level in the dephlegmator leg. The reflux steam flow rates into the column were adjusted to closely approximate the original top and kettle temperatures. After equilibrium was reached, data were recorded and a kettle product sample for $C_4$ analysis was obtained. The following table presents the data obtained:

*Comparative data furfural stripping column*

|  | Deph. Out of Service | Deph. in Service |
| --- | --- | --- |
| Kettle Temperature, °F | 305 | 308 |
| 6th Tray Temperature, °F | 298 | 299 |
| Feed Temperature, °F | 259 | 265 |
| OHP Temperature, °F | 132 | 130 |
| Reflux Temperature, °F | 90 | 87 |
| KP Rate, Gal./Hr | 41,000 | 47,000 |
| Reflux Rate, Gal./Hr | 17,000 | 10,500 |
| Steam Rate, Lbs./Hr | 37,600 | 32,100 |
| $C_4$ in KP, Liq | Trace | Trace |

To maintain the same top and kettle temperatures with the dephlegmator in service, it was observed that the reflux rate decreased 6,500 gallons per hour, and the steam rate decreased 5,500 pounds per hour in spite of additional feed as reflected by an increase of 6,000 g.p.h. kettle product.

While the invention is particularly suited for the separation of butane, butenes, butylenes, or butadiene from a mixture of two or more of the named materials, the process of this invention is applicable generally to the separation of hydrocarbons having different chemical or molecular structures. For example, according to this invention, paraffinic hydrocarbons can be separated from non-paraffinic hydrocarbons; paraffinic hydrocarbons can be separated from aromatic hydrocarbons; paraffinic hydrocarbons from cycloparaffinic hydrocarbons; cycloparaffinic hydrocarbons from aromatic hydrocarbons; and olefinic hydrocarbons from non-olefinic hydrocarbons.

While the invention has been described with respect to a furfural system, other suitable solvents are glycol ethers such as polyethylene glycols, polypropylene glycols, Carbitols, and Cellosolves. Specific examples of solvents utilizable in the process of this invention are triethylene glycol, tetraethylene glycol, dipropylene glycol and the alkyl ethers of polyethylene glycol. Suitable alkyl ethers are the Carbitols, such as methyl, propyl, and butyl Carbitols, and the Cellosolves, such as methyl, ethyl, propyl, and butyl Cellosolves. Triethylene glycol is a highly satisfactory solvent in many instances. Also, a commercial product sold as polyethylene glycol and containing several individual polyethylene glycols is suitable. It is also within the contemplation of the invention to utilize glycol instead of water as the antisolvent or solvent of low solubility.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. Thus, for example, the rate of flow of the reflux to columns 1 and 19 can be manipulated responsive to the respective overhead temperatures, the temperature at a particular point in the respective columns, the temperature of the respective reflux fluid, or the pressure of the respective overheads. The rate of flow of heat to coils 4 and 21 can be manipulated responsive to overhead temperature or temperature at another point of the respective columns. The rate of flow of the water in line 37 can be manipulated responsive to the water phase level on tray 36. Suffice to say, the drawing is for illustrative purposes, as is the description thereof.

We claim:

1. In a process of separating a hydrocarbon from a stream of a furfural water mixture containing said hydrocarbon absorbed therein which comprises introducing said stream into a stripping zone, introducing heat into a lower portion of said stripping zone, removing from said stripping zone a stripped overhead product comprising said hydrocarbon and a portion of said water, condensing a portion of said stripped overhead product and refluxing said stripping zone with a portion of the condensate thus obtained, removing a bottoms product of lean furfural-water mixture from a lower portion of said stripping zone, and wherein a liquid phase separation into a lower heavier liquid phase and an upper lighter liquid phase occurs in said stripping zone at a point above the introduction of said stream into said stripping zone; the improvement comprising removing liquid from said stripping zone being at least a portion of said heavier liquid phase, and reintroducing the thus removed portion of said heavier liquid phase as liquid into a lower portion of said stripping zone at a point below the point of introduction of said stream into said stripping zone.

2. The process according to claim 1 wherein said hydrocarbon is butadiene.

References Cited by the Examiner

UNITED STATES PATENTS

| Re. 22,811 | 11/1946 | Scarth | 208—321 |
| 2,372,668 | 4/1945 | Hachmuth | 260—681.5 |
| 2,376,923 | 5/1945 | Kraft | 208—187 |
| 2,419,039 | 4/1947 | Scarth | 260—681.5 |
| 2,730,558 | 1/1956 | Gerhold | 260—674 |
| 3,026,253 | 3/1962 | Woerner | 260—681.5 |
| 3,026,254 | 3/1962 | Hutto | 202—46 |

FOREIGN PATENTS 594,099   3/1960   Canada.

OTHER REFERENCES

Perry, Chemical Engineers' Handbook, 1950, third edition, pages 645–647.

Weissberger, Distillation, 1951, vol. 4, Interscience Pub., pages 374–378.

ALPHONSO D. SULLIVAN, *Primary Examiner.*